United States Patent [19]
Naito

[11] 3,978,683
[45] Sept. 7, 1976

[54] ABSORPTION REFRIGERATOR OF NATURAL CIRCULATION TYPE

[75] Inventor: Satoshi Naito, Kosai, Japan

[73] Assignee: Yazaki Sogyo Kabushiki Kaisha, Tokyo, Japan

[22] Filed: Sept. 4, 1975

[21] Appl. No.: 610,177

[30] Foreign Application Priority Data
Sept. 19, 1974 Japan............................ 49-107152

[52] U.S. Cl................................... 62/174; 62/476; 62/495
[51] Int. Cl.² ......................................... F25B 41/00
[58] Field of Search ............. 62/476, 495, 108, 174, 62/503, 141

[56] References Cited
UNITED STATES PATENTS

| | | | |
|---|---|---|---|
| 2,282,503 | 5/1942 | Thomas et al. ..................... | 62/487 |
| 2,682,156 | 6/1954 | Ullstrand ........................... | 62/108 |
| 2,797,557 | 7/1957 | Fogel ................................. | 62/495 |
| 3,138,938 | 6/1964 | Beardslee........................... | 62/174 |
| 3,141,307 | 7/1964 | Beardslee........................... | 62/141 |

Primary Examiner—Lloyd L. King
Attorney, Agent, or Firm—Oldham & Oldham Co.

[57] ABSTRACT

An absorption refrigerator of natural circulation type employing water as a refrigerant and lithium salt as an absorbing medium, in which a U-tube is disposed in a conduit portion between a condenser and an evaporator and is connected at one end thereof to a separator in addition to the condenser and at the other end thereof to a refrigerant reservoir. A cooling conduit extends into this refrigerant reservoir to maintain substantially constant the internal pressure of the reservoir so that the amount of the refrigerant stored in the reservoir can be controlled depending on the pressure difference between the separator side of the U-tube and the reservoir side of the U-tube. Therefore, the concentration of the lithium salt solution circulating through the refrigeration system can be controlled depending on the temperature of a heating medium supplied to a generator.

2 Claims, 3 Drawing Figures

ABSORPTION REFRIGERATOR OF NATURAL CIRCULATION TYPE

BACKGROUND OF THE INVENTION

This invention relates to an absorption refrigerator of natural circulation type employing water as a refrigerant and an aqueous solution of lithium salt as an absorbing medium. More particularly, this invention relates to an absorption refrigerator of natural circulation type in which low-temperature energy is utilized as a heat source for the generator.

U.S. Pat. No. 2,282,503 discloses a prototype of absorption refrigerators of natural circulation type with which the present invention is concerned. The refrigerator disclosed in the U.S. patent above cited employs water as a refrigerant and a lithium salt or salts such as lithium chloride or lithium bromide as an absorbing medium, and these salts are present in the form of an aqueous solution thereof in the refrigeration system.

In the absorption refrigerator of natural circulation type above referred to, the aqueous solution of the lithium salt is heated to boil in a generator and is lifted through a gas-liquid lift into a separator located at an upper level according to the principle of an air lift pump, and is separated into water vapor and the residual concentrated lithium salt solution in the separator. This water vapor is subsequently cooled to condense in a condensor, and the condensate or water is fed to an evaporator. The water fed to the evaporator is vaporized again since the internal pressure of the evaporator is sufficiently low to such an extent that the water can be readily vaporized. Due to the fact that vaporization of the water takes heat and thus produces cooling energy, another fluid flowing through the evaporator is cooled and this cooled fluid is suitably utilized as a source of refrigeration, for example, for cooling of rooms.

In the meantime, the concentrated lithium salt solution separated from the water vapor in the separator is supplied to a heat exchanger to be subject to heat exchange with a dilute lithium salt solution described later, and the concentrated lithium salt solution thus cooled down to a low temperature is then fed to an absorber. In the absorber, this concentrated lithium salt solution absorbs the water vapor produced in the evaporator to turn into a dilute lithium salt solution. This dilute lithium salt solution is subsequently fed to the heat exchanger to be subject to heat exchange with the concentrated lithium salt solution as above described, and the dilute lithium salt solution thus heated as a result of the heat exchange is returned to the generator again. The cycle above described is repeated to carry out the desired refrigeration.

However, when the temperature of the heating medium or hot water supplied to the generator is reduced to a value lower than a lower limit, boiling of the dilute lithium salt solution would not occur in the generator. It is therefore impossible to operate the prior art refrigerator of this kind in the desired manner. Further, even when the temperature of the heating medium or hot water is conversely increased beyond a predetermined setting, the concentration of the lithium salt solution is not increased although the amount of the circulating refrigerant is increased. Thus, the rate of absorption of the refrigerant in the concentrated lithium salt solution in the absorber is not increased, and a part of the refrigerant of increased amount cannot be vaporized in the evaporator to provide an unavailable refrigerant which does not contribute to the refrigeration.

U.S. Pat. No. 3,177,930 discloses an improved absorption refrigerator of this kind in an attempt to overcome the defect pointed out above. In this improved absorption refrigerator, a vessel forming substantially a U-tube is provided between the separator and the evaporator so that the concentration of the lithium salt solution can be varied by varying the amount of the refrigerant stored in the reservoir. While fairly satisfactory results could be obtained with such absorption refrigerator, it has been difficult to properly control the amount of the refrigerant stored in the refrigerant reservoir due to a great pressure variation in the evaporator.

It is therefore a primary object of the present invention to provide improvements in the structure and arrangement of the absorption refrigerator disclosed in said U.S. Pat. No. 3,177,930. In the improved absorption refrigerator of natural circulation type according to the present invention, the refrigerant reservoir is closed at one end thereof and a cooling water conduit extends into the refrigerant reservoir for maintaining substantially constant the temperature of the refrigerant stored in the refrigerant reservoir, so that the vapor pressure in the refrigerant reservoir can be maintained substantially constant and the amount of the refrigerant stored in the refrigerant reservoir can thereby be controlled depending on the difference between the pressure in the separator and that in the refrigerant reservoir.

In accordance with one aspect of the present invention, there is provided an absorption refrigerator of natural circulation type employing water as a refrigerant and lithium salt as an absorbing medium, comprising a generator for heating to boil a dilute lithium salt solution, a separator for separating water vapor expelled in said generator from the concentrated lithium salt solution, a condenser for condensing the water vapor separated in said separator, an evaporator for revaporizing the water or refrigerant condensed in said condenser by heat exchange with another fluid, an absorber for reintroducing the water vapor generated in said evaporator into said separated concentrated lithium salt solution thereby diluting said concentrated lithium salt solution, and a U-tube disposed in the conduit portion between said condenser and said evaporator, said U-tube being connected at one end thereof to said conduit portion and at the other end thereof to a refrigerant reservoir, wherein the improvement comprises a cooling conduit extending into said refrigerant reservoir for maintaining substantially constant the internal pressure of said refrigerant reservoir so as to control the amount of the refrigerant stored in said refrigerant reservoir depending on the pressure differential across said U-tube, whereby the concentration of said lithium salt solution circulating through the refrigeration system can be controlled depending on the temperature of the heating medium supplied to said generator so as to compensate for variations of the refrigerating capacity due to variations of the heating temperature.

In accordance with another aspect of the present invention, there is provided an absorption refrigerator of natural circulation type employing water as a refrigerant and lithium salt as an absorbing medium, comprising a generator for heating to boil a dilute lithium salt solution, a separator for separating water vapor expelled in said generator from the concentrated lithium salt solution, a condenser for condensing the water vapor separated in said separator, an evaporator for vaporizing the water or refrigerant condensed in said condenser by heat exchange with another fluid, an absorber for reintroducing the water vapor generated in said evaporator into said separated concentrated lithium salt solution thereby diluting said concentrated lithium salt solution, and a U-tube disposed in the conduit portion between said condenser and said evaporator, said U-tube being connected at one end thereof to said conduit portion and to said separator to receive the pressure in said separator and at the other end thereof to a refrigerant reservoir, wherein the improvement comprises a cooling conduit extending into said refrigerant reservoir for maintaining substantially constant the internal pressure of said refrigerant reservoir so as to control the amount of the refrigerant stored in said refrigerant reservoir depending on the difference between the pressure in the U-tube portion connected to said separator and that in the U-tube portion connected to said refrigerant reservoir, whereby the concentration of said lithium salt solution circulating through the refrigeration system can be controlled depending on the temperature of the heating medium supplied to said generator so as to compensate for variations of the refrigerating capacity due to variations of the heating temperature.

The above and other objects, features and advantages of the present invention will appear more fully hereinafter from the following detailed description of a preferred embodiment thereof taken in conjunction with the accompanying drawings.

DESCRIPTION OF THE PREFERRED EMBODIMENT

Figure 1:
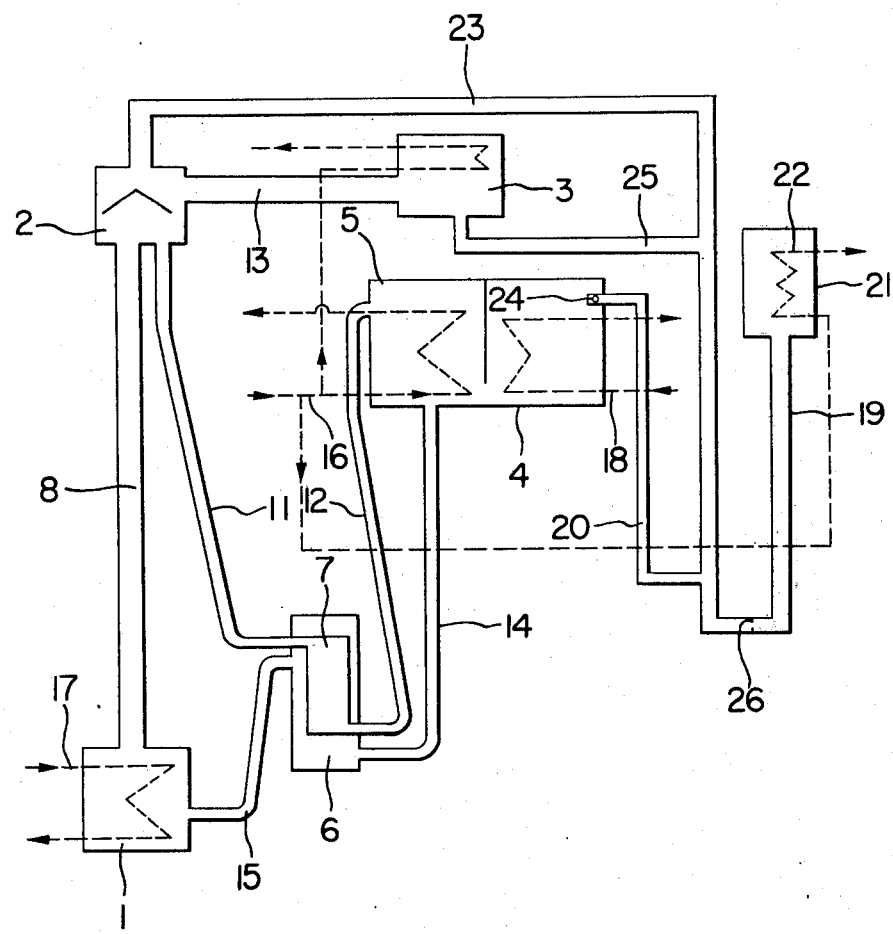
FIG. 1 is a diagrammatic view of an embodiment of the absorption refrigerator of natural circulation type according to the present invention employing water as a refrigerant and lithium salt as an absorbing medium.

Referring to FIG. 1, the absorption refrigerator of natural circulation type embodying a preferred form of the present invention comprises a generator 1 for heating to boil a dilute lithium salt solution, a separator 2 for separating water vapor expelled in the generator 1 from the concentrated lithium salt solution, a condenser 3 for condensing the water vapor separated in the separator 2, an evaporator 4 for vaporizing the water (refrigerant) condensed in the condenser 3, an absorber 5 for reintroducing the water vapor generated in the evaporator 4 into the concentrated lithium salt solution separated in the separator 2, a heat exchanger 6, a concentrated lithium salt solution container 7 disposed within the heat exchanger 6, and a gas-liquid lift 8 connecting the generator 1 to the separator 2. A conduit 25 is provided to feed the refrigerant condensed in the condenser 3 to the evaporator 4. An orifice 24 is provided to maintain a pressure differential between the condenser 3 and the evaporator 4. A plurality of conduits 11, 12, 13, 14 and 15 are provided to interconnect the elements in the refrigeration system as shown. Cooling water is supplied by a conduit 16, and hot water is supplied by a conduit 17 which extends into the generator 1 for heating to boil the dilute lithium salt solution in the generator 1. An evaporator coil 18 connected to a room cooling unit such as a fan coil unit extends into the evaporator 4.

The dilute lithium salt solution in the generator 1 is, for example, an aqueous solution of lithium bromide. This solution is heated to boil by the heat of the hot water flowing through the hot water supply conduit 17. The water vapor expelled from the lithium salt solution is carried upwards together with the concentrated lithium salt solution into the separator 2 through the gas-liquid lift 8. The water vapor is separated from the concentrated lithium salt solution in the separator 2. The separated water vapor is introduced into the condenser 3 through the conduit 13 and is cooled to condense by being cooled by the cooling water flowing through the cooling water supply conduit 16. This condensate is used as the refrigerant. The refrigerant is fed through the conduit 25 and orifice 24 to be sprayed onto the coil 18 in the evaporator 4. The refrigerant introduced into the evaporator 4 is immediately vaporized to cool a fluid flowing through the coil 18 by the latent heat of vaporization due to the fact that the internal pressure of the evaporator 4 is sufficiently low to such an extent that water is readily vaporized. This cooled fluid is supplied to the fan coil unit in the room to cool the room.

The concentrated lithium salt solution separated in the separator 2 is fed through the conduit 11 to the concentrated solution container 7 in the heat exchanger 6 and is subject to heat exchange with the dilute lithium salt solution described later with the result that the temperature thereof is decreased. The concentrated lithium salt solution of reduced temperature is then fed through the conduit 12 to the absorber 5 in which the solution is sprayed onto the cooling water supply coil 16, and the temperature thereof is further reduced. The water vapor generated in the evaporator 4 is fed to the absorber 5 to be absorbed in the cooled concentrated lithium salt solution to dilute this solution. This dilute lithium salt solution is fed through the conduit 14 to the heat exchanger 6 to be subject to heat exchange with the concentrated lithium salt solution contained in the concentrated solution container 7, with the result that the temperature thereof is raised. This dilute lithium salt solution having the temperature thereof increased as a result of the heat exchange is returned again to the generator 1. The cycle above described is repeated to continue the operation of the absorption refrigerator.

Figure 3:
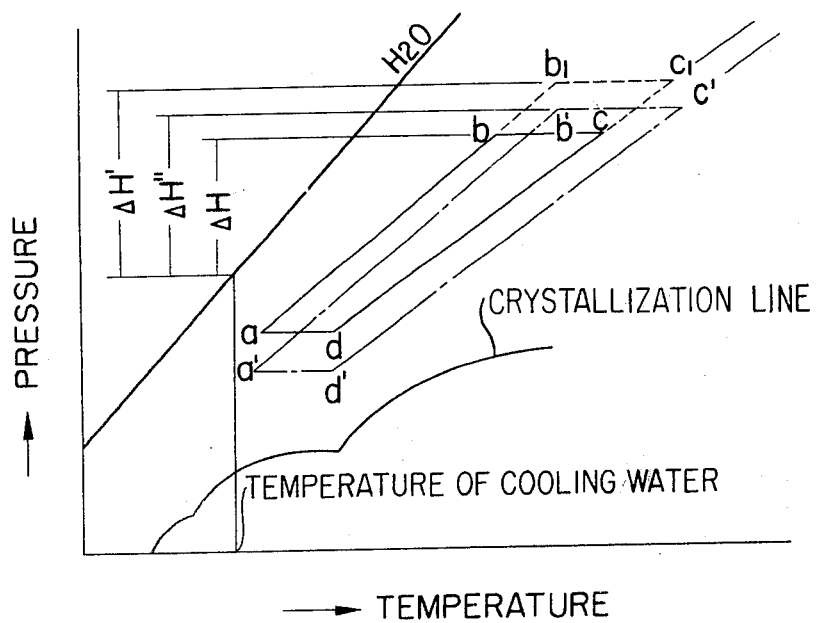
FIG. 3 is a graph showing the operating cycle of the refrigerator of this kind.

FIG. 3 is a diagram showing the relation between the pressure and the temperature of the lithium salt solution used in the absorption refrigerator of this type, with the concentration of the lithium salt solution taken as a parameter. In FIG. 3, the cycle abcd shown by the solid lines represents the behavior of the lithium salt solution used in the absorption refrigerator described herein before.

In the cycle portion $d \rightarrow a$ in FIG. 3, the refrigerant or water is absorbed in the concentrated lithium salt solution to dilute this solution. In the cycle portion $a \rightarrow b$, the dilute lithium salt solution is heated in the heat exchanger 6 and the temperature and pressure thereof are increased, although a part of such step is also carried out in the generator 1. In the cycle portion $b \rightarrow c$, the temperature of the dilute lithium salt solution is increased by being heated by the heating medium supplied to the generator 1. In the cycle portion $c \rightarrow d$, the temperature and pressure of the concentrated lithium salt solution contained in the concentrated solution container 7 in the heat exchanger 6 are decreased as a result of the heat exchange.

However, the refrigerator of this kind cannot properly operate when the temperature of the heating medium supplied to the generator 1 by the hot water supply conduit 17 is reduced to a value lower than a certain lower limit. This is because boiling of the dilute lithium salt solution in the generator 1 cannot occur in such a case. Further, even when the temperature of the hot water is conversely increased beyond a predetermined setting, the concentration of the lithium salt solution is not increased although the amount of the circulating refrigerant is increased. Thus, the rate of absorption of the refrigerant in the concentrated lithium salt solution in the absorber 5 is not increased, and a part of the refrigerant of increased amount cannot be vaporized in the evaporator 4 to provide an unavailable refrigerant which does not contribute to the refrigeration.

In the conventional absorption refrigerator proposed to overcome such effect, a U-tube is connected between the separator and the evaporator, and a refrigerant reservoir is provided on the evaporator side of the U-tube. This refrigerator utilizes the fact that the pressure difference between the separator and the evaporator is variable depending on the temperature of the heating medium used for heating the dilute lithium salt solution in the generator, so as to vary the amount of the refrigerant stored in the refrigerant reservoir thereby varying the concentration of the lithium salt solution. While fairly satisfactory results could be obtained with such absorption refrigerator, it has been difficult to properly control the amount of the refrigerant stored in the refrigerant reservoir due to a great pressure variation in the evaporator.

The absorption refrigerator according to the present invention is to further improve the refrigerator, or overcome such a fault. In the absorption refrigerator of the present invention, the refrigerant reservoir is closed at one end thereof and a cooling water supply conduit extends into the refrigerant reservoir for maintaining substantially constant the temperature of the refrigerant stored in the refrigerant reservoir, so that the vapor pressure in the refrigerant reservoir can be maintained substantially constant and the amount of the refrigerant stored in the refrigerant reservoir can thereby be controlled depending on the pressure difference between the U-tube portion connected to the separator and the U-tube portion connected to the refrigerant reservoir.

Figure 2:
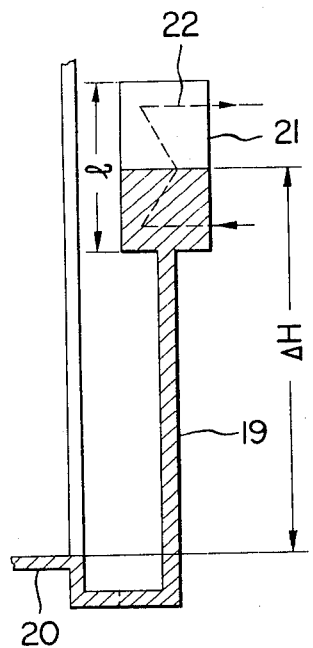
FIG. 2 is an enlarged partial view of FIG. 1 to illustrate the operation of the refrigerator of the present invention.

The improvement according to the present invention will now be described in more detail with reference to the drawings. Referring to FIGS. 1 and 2, a U-tube 19 is connected at one end thereof to the conduit 25 leading to the condenser 3. This end of the U-tube 19 is further connected to the evaporator 4 by a conduit 20 and to the separator 2 by a conduit 23. The other end of the U-tube 19 is connected to a refrigerant reservoir 21, and a cooling water supply conduit 22 which may be connected to the conduit 16 extends into the refrigerant reservoir 21 to maintain substantially constant the temperature of the refrigerant stored in the reservoir 21 so that the vapor pressure in the refrigerant reservoir 21 can be maintained substantially constant. An orifice 26 is provided in the U-tube 19 to avoid abrupt flow of the refrigerant into and out of the refrigerant reservoir 21. The difference between the pressure in the separator 2 and that in the refrigerant reservoir 21 is utilized to vary the amount of the refrigerant stored in the refrigerant reservoir 21 thereby varying the concentration of the lithium salt solution. Thus, the amount of the refrigerant stored in the refrigerant reservoir 21 increases with the increase in the temperature of the hot water supplied to the generator 1. Consequently, the concentration of the lithium salt solution circulating through the refrigeration system is increased and the efficiency of absorption in the absorber 5 is improved.

The refrigerant condensed in the condenser 3 is fed into the U-tube 19 by the conduit 25 without being directly fed to the evaporator 4. The refrigerant fed through the U-tube 19 is stored in the refrigerant reservoir 21 up to a level corresponding to the vapor pressure difference between the refrigerant in the separator 2 and that in the refrigerant reservoir 21, that is, up to a level corresponding to $\Delta H$ shown in FIG. 2 and FIG. 3. FIG. 2 shows the levels of the refrigerant in the U-tube 19 and refrigerant reservoir 21 by hatching. It will be seen in FIG. 2 that the refrigerant is lifted up to the level corresponding to $\Delta H$ measured from the inlet of the conduit 20 and is held in a steady state. The refrigerant which flows out thereafter from the condenser 3 through the conduit 25 passes through the conduit 20 and the orifice 24 to be sprayed onto the evaporator coil 18 in the evaporator 4. Therefore, the refrigerant in the refrigerant reservoir 21 is kept in the same level.

Suppose now that the temperature of the hot water supplied by the hot water supply conduit 17 to the generator 1 is increased beyond the designed value. Then, the points $b$ and $c$ in FIG. 3 shift to points $b_1$ and $c_1$, respectively, and the pressure difference between the separator 2 and the refrigerant reservoir 21 is now represented by $\Delta H'$. Therefore, the pressure difference increases by $(\Delta H' - \Delta H)$. As a result, the liquid level of the refrigerant in the refrigerant reservoir 21 is raised by a height corresponding to the increment of the differential pressure, and the amount of the stored refrigerant increases correspondingly. The amount of the refrigerant circulating through the refrigeration system decreases by the amount corresponding to the increment of the stored refrigerant resulting in the increase in the concentration of the lithium salt solution. Due to the increase in the concentration of the lithium salt solution, the points $a$, $b_1$, $c_1$ and $d$ in FIG. 3 shift to points $a'$, $b'$, $c'$ and $d'$, respectively, and the pressure difference between the separator 2 and the refrigerant reservoir 21 is now represented by $\Delta H''$ in FIG. 3. Therefore, in order that the absorption refrigerator can now operate according to the new cycle $a'\ b'\ c'\ d'$, the sectional area of the refrigerant reservoir 21 may be determined so that the amount of the refrigerant increasing in the refrigerant reservoir 21 due to the pressure difference increment of $(\Delta H'' - \Delta H)$ may be equal to the amount required for increasing the concentration of the lithium salt solution used in the previous cycle $a\ b\ c\ d$ up to the concentration of the lithium salt solution required for operation according to the new cycle $a'\ b'\ c'\ d'$.

The increase in the amount of the refrigerant stored in the refrigerant reservoir 21 can be limited to a certain limit regardless of whatever increase in the pressure difference between the separator 2 and the refrigerant reservoir 21 when the height 1 (FIG. 2) of the refrigerant reservoir 21 is suitable selected. Thus, the concentration of the lithium salt solution circulating through the refrigeration system can be limited to within an allowable range which will not cause undesirable precipitation of the salt.

When the temperature of the hot water supplied by the conduit 17 is restored to the normal value designed for the proper operation of the refrigeration system, the refrigerant stored in the refrigerant reservoir 21 flows out by the amount corresponding to the decrement of the pressure differential, that is, by the amount corresponding to ($\Delta H'' - \Delta H$), and the concentration of the lithium salt solution is reduced correspondingly.

It will thus be seen that the pressure difference between the separator 2 and the refrigerant reservoir 21 increases to increase the amount of the refrigerant stored in the refrigerant reservoir 21 with the increase in the temperature of the hot water used for heating the dilute lithium salt solution in the generator 1. As a result, the concentration of the concentrated lithium salt solution separated from the water vapor in the separator 2 is increased to increase the rate of absorption in the absorber 5 so that the water vapor generated in the evaporator 4 can be satisfactorily absorbed in the concentrated lithium salt solution of increased concentration, and the refrigerating capacity can be increased. Efficient refrigeration can therefore be carried out.

It will be understood from the foregoing detailed description that the absorption refrigerator according to the present invention can operate quite efficiently even when a variation occurs in the temperature of the hot water used for heating the dilute lithium salt solution in the generator.

Therefore, the absorption refrigerator of the present invention can operate efficiently even with hot water of unstable temperature supplied from, for example, a solar energy collector.

As many apparently widely different embodiments of this invention may be made without departing from the spirit and scope thereof, it is to be understood that the invention is in no way limited to the specific embodiment thereof except as defined in the appended claims.

What is claimed is:

1. An absorption refrigerator of natural circulation type employing water as a refrigerant and lithium salt as an absorbing medium, comprising a generator for heating to boil a dilute lithium salt solution, a separator for separating water vapor expelled in said generator from the concentrated lithium salt solution, a condenser for condensing the water vapor separated in said separator, an evaporator for vaporizing the water or refrigerant condensed in said condenser by heat exchange with another fluid, an absorber for reintroducing the water vapor generated in said evaporator into said separated concentrated lithium salt solution thereby diluting said concentrated lithium salt solution, and a U-tube disposed in the conduit portion between said condenser and said evaporator, said U-tube being connected at one end thereof to said conduit portion and at the other end thereof to a refrigerant reservoir, wherein the improvement comprises a cooling conduit extending into said refrigerant reservoir for maintaining substantially constant the internal pressure of said refrigerant reservoir so as to control the amount of the refrigerant stored in said refrigerant reservoir depending on the pressure differential across said U-tube, whereby the concentration of said lithium salt solution circulating through the refrigeration system can be controlled depending on the temperature of the heating medium supplied to said generator so as to compensate for variations of the refrigerating capacity due to variations of the heating temperature.

2. An absorption refrigerator of natural circulation type employing water as a refrigerant and lithium salt as an absorbing medium, comprising a generator for heating to boil a dilute lithium salt solution, a separator for separating water vapor expelled in said generator from the concentrated lithium salt solution, a condenser for condensing the water vapor separated in said separator, an evaporator for vaporizing the water or refrigerant condensed in said condenser by heat exchange with another fluid, an absorber for reintroducing the water vapor generated in said evaporator into said separated concentrated lithium salt solution thereby diluting said concentrated lithium salt solution, and a U-tube disposed in the conduit portion between said condenser and said evaporator, said U-tube being connected at one end thereof to said conduit portion and to said separator to receive the pressure in said separator and at the other end thereof to a refrigerant reservoir, wherein the improvement comprises a cooling conduit extending into said refrigerant reservoir for maintaining substantially constant the internal pressure of said refrigerant reservoir so as to control the amount of the refrigerant stored in said refrigerant reservoir depending on the pressure difference between the U-tube portion connected to said separator and the U-tube portion connected to said refrigerator reservoir, whereby the concentration of said lithium salt solution circulating through the refrigeration system can be controlled depending on the temperature of the heating medium supplied to said generator so as to compensate for variations of the refrigerating capacity due to variations of the heating temperature.

* * * * *